(12) United States Patent
Mainard et al.

(10) Patent No.: US 7,107,046 B1
(45) Date of Patent: Sep. 12, 2006

(54) SERVICE TRANSMISSION SYSTEM RELATED TO RELEVANT GEOGRAPHICAL ZONES AND RECEIVER DESIGNED TO BE USED WITH SAID TRANSMISSION SYSTEM

(75) Inventors: Laurent Mainard, Rennes (FR); Oliver Perrault, Noyal S/Vilaine (FR)

(73) Assignees: France Telecom, S.A., Paris (FR); Teldiffusion de France SA, Paris (FR)

(*) Notice: Subject to any disclaimer, the term of this patent is extended or adjusted under 35 U.S.C. 154(b) by 0 days.

(21) Appl. No.: 09/890,300

(22) PCT Filed: Feb. 1, 2000

(86) PCT No.: PCT/FR00/00224

§ 371 (c)(1),
(2), (4) Date: Oct. 22, 2001

(87) PCT Pub. No.: WO00/46939

PCT Pub. Date: Aug. 10, 2000

(30) Foreign Application Priority Data

Feb. 2, 1999 (FR) .................................. 99 01412
Mar. 29, 1999 (FR) .................................. 99 04113

(51) Int. Cl.
*H04M 3/493* (2006.01)
*H04Q 4/20* (2006.01)

(52) U.S. Cl. .............................. 455/414.2; 455/456.3; 455/443

(58) Field of Classification Search ............. 455/404.2, 455/414.1–414.2, 443, 456.3, 456.6
See application file for complete search history.

(56) References Cited

U.S. PATENT DOCUMENTS

| | | | | |
|---|---|---|---|---|
| 5,230,081 A | * | 7/1993 | Yamada et al. | 455/456.3 |
| 5,327,144 A | * | 7/1994 | Stilp et al. | 342/387 |
| 5,465,390 A | * | 11/1995 | Cohen | 455/446 |
| 5,508,707 A | * | 4/1996 | LeBlanc et al. | 342/457 |
| 5,568,654 A | * | 10/1996 | Fukawa | 455/456.3 |
| 5,838,277 A | | 11/1998 | Loomis et al. | |
| 5,950,125 A | * | 9/1999 | Buhrmann et al. | 455/432.1 |
| 5,999,126 A | * | 12/1999 | Ito | 342/357.1 |
| 6,028,550 A | * | 2/2000 | Froeberg et al. | 342/357.13 |

(Continued)

FOREIGN PATENT DOCUMENTS

WO  WO 96/07110  3/1996

*Primary Examiner*—Fan Tsang
*Assistant Examiner*—Joseph T Phan
(74) *Attorney, Agent, or Firm*—Lowe, Hauptman & Berner, LLP

(57) ABSTRACT

The present invention relates to a transmission system for services which are linked to relevant geographic zones. Said system comprises at least one set of transmitters (1,2,3,4) transmitting said services to said zones (11,12,13,14) and a receiver (100) filled with a receiver sub-assembly (110) to receive said services, further with a locating unit (130) determining the said receiver's geographic zone and a switching unit (140) switching said receiver sub-assembly (110) to receive the service(s) linked to the relevant zones corresponding to the geographic position determined by said locating unit (130). In the invention, said transmission system or each transmitter will transmit simultaneously the services linked to the relevant zones under its coverage and the descriptions of the relevant zones (11, 12, 13, 14), also the addresses of said services as well as the descriptions of the relevant zones (11, 12, 13, 14) and the addresses of the zones neighboring the zones under coverage. The present invention also applies to a receiver used in conjunction with said transmission system.

12 Claims, 2 Drawing Sheets

U.S. PATENT DOCUMENTS

Figure 1:
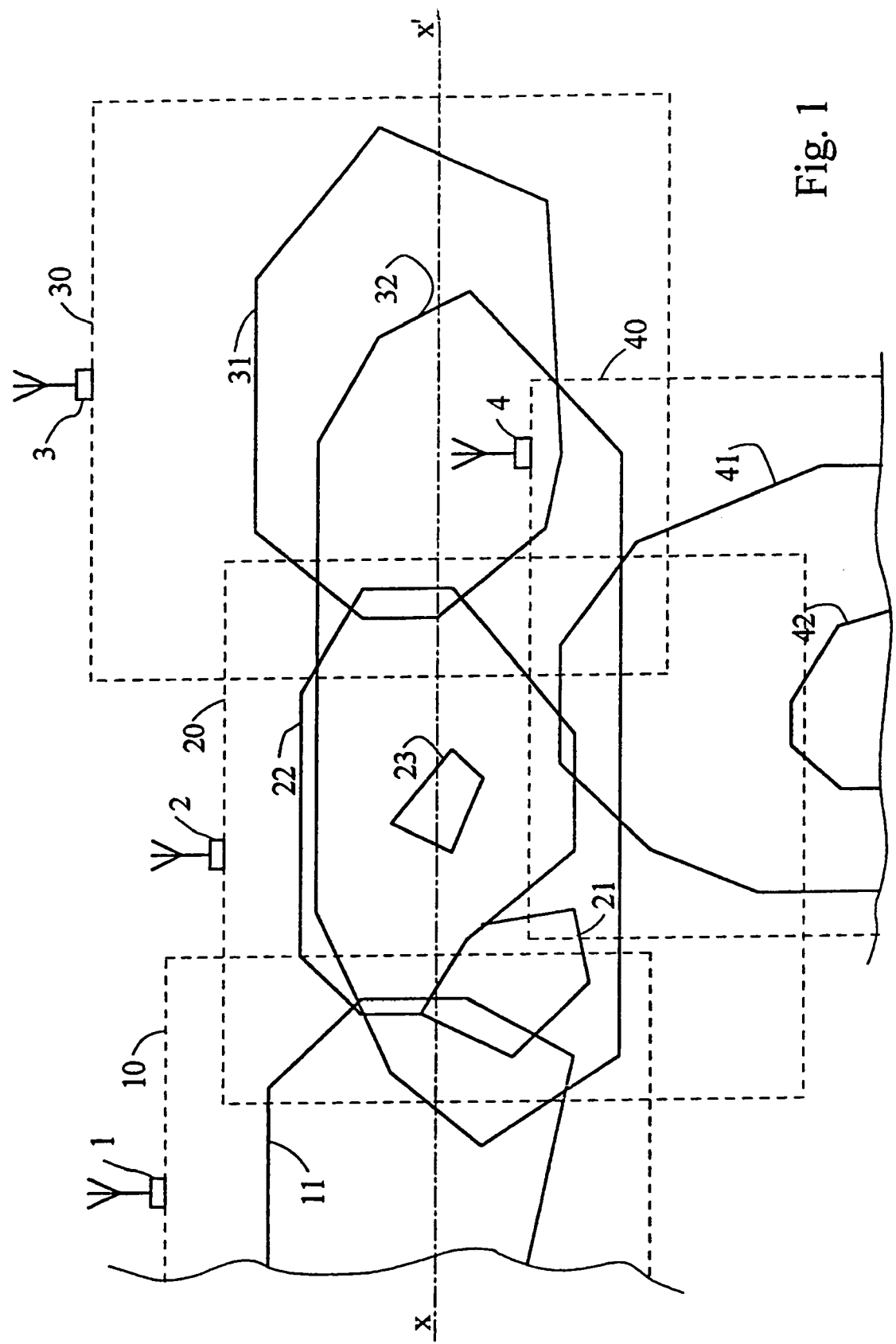

| | | | |
|---|---|---|---|
| 6,101,381 A * | 8/2000 | Tajima et al. | 455/414.2 |
| 6,232,917 B1 * | 5/2001 | Baumer et al. | 342/357.13 |
| 6,246,954 B1 * | 6/2001 | Berstis et al. | 701/117 |
| 6,324,404 B1 * | 11/2001 | Dennison et al. | 455/456.1 |
| 6,356,761 B1 * | 3/2002 | Huttunen et al. | 455/456.1 |
| 6,360,098 B1 * | 3/2002 | Ganesh et al. | 455/436 |
| 6,442,394 B1 * | 8/2002 | Valentine et al. | 455/456.3 |
| 6,505,046 B1 * | 1/2003 | Baker | 455/456.3 |
| 6,580,904 B1 * | 6/2003 | Cox et al. | 455/456.2 |

* cited by examiner

SERVICE TRANSMISSION SYSTEM RELATED TO RELEVANT GEOGRAPHICAL ZONES AND RECEIVER DESIGNED TO BE USED WITH SAID TRANSMISSION SYSTEM

The present invention relates to a transmission system for relevant geographic zones and to a receiver being used together with said transmission system.

The technical field of the invention relates to transmitters that are set-up in predetermined zones and transmit information closely applying to the geographically locations of said zones and of which the interpretation also remains tied to the geographic location of the receivers of such information. Illustratively such information may relate to road events such as a traffic jams and is significant only when location specific and if the end user of said receiver is enabled to easily determine whether he/she is affected or not.

Broadcasting services providing information of road traffic already are available in Europe or are being standardized. As regards broadcast services, they are based on an RDS/TMC standard.

Switching from a service assigned to a first zone to a service assigned to a second zone is implemented by switching the receiver from a transmitter of the first zone to a transmitter of a second zone, such switching being carried on the basis on one hand of location data obtained from a locating system such as the global positioning system GPS and on the other hand on data about the accurate geographic bounds of those services of which the broadcasts are likely to be received such data are permanently stored in the receiver.

Accordingly, while a receiver is set at transmitter broadcasting data to a first zone, when a vehicle passes from said first zone into a second zone, the receiver shall know what services it has access to and then will seek the second zone data at the frequency of another transmitter.

Regardless of the geographic-content services, systems such as the one known as DAB (Digital Audio Broadcast) allow broadcasting data specifying the location of neighboring transmitters as well as their coverage zone crudely represented by a mere rectangle, however omitting accurate disclosure of contents of broadcast services.

The drawback of the known method of broadcasting information about such relevant zones is the present impossibility of transmitting information relating to an accurately defined relevant zone.

Either this zone transmission is restricted to crudely estimating the range of a transmitter (regardless of information content) to allow switching between transmitters, or only the global range of the service will be indicated by one or more coarse regional parameters ("national", "regional" . . . ).

Another drawback is that the relevant zones and hence the zones where switching will occur are stored in the receiver but cannot be automatically radio-loaded in relation to receiver moves or to the data incoming at this receiver. Therefore a new service requiring accurate switching based on already extant services cannot be launched unless the receivers be updated.

Accordingly it is the objective of the present invention to create a services transmission system free of the above described drawbacks.

For that purpose a services transmission system of the invention relating to given geographic zones comprises at least one transmitter to transmit said services to said zones and one receiver fitted with a receiver sub-assembly accepting said service information, a locating unit to determine the geographic position of said receiver and a switching unit to switch said receiver sub-assembly to connect to the service (s) linked to the relevant zone(s) corresponding to the geographic position that was determined by said locating unit.

Said services transmission system is characterized in that each transmitter will simultaneously transmit the services linked to the relevant zones part of its coverage and the description of the relevant zones and the addresses of said services as well as the description of the relevant zones and the addresses of the services of the neighboring zones to those zones which partly overlap said portion of its coverage.

In another feature of the invention, at least one relevant geographic zone among said relevant zones is defined being overlapping at least one neighboring relevant zone. Illustratively each relevant geographic zone is defined by a set of geometric features, advantageously by a closed set of lines defining one or several polygons. Said at least one polygon may be configured with at least one of its apices at given road markers. Some relevant zones also may be included rigorously in other relevant zones.

In another feature of the invention, and in addition to the description of the relevant zones and the addresses of said services, each transmitter transmits optional information on data density and service quality.

The present invention also relates to a receiver receiving services linked to relevant geographic zones and transmitted by at least one transmitter. This receiver is characterized in that it comprises a locating unit determining said receiver's geographic position, a receiver sub-assembly able to simultaneously receive the services linked to the zones in which it is located together with the descriptions of the relevant zones and the addresses of said services plus the descriptions of the relevant zones and the service addresses of the zones neighboring to its coverage, and a switching unit to receive said descriptions and to switch said receiver sub-assembly in order that it receive the service(s) linked to the relevant zone(s) corresponding to the geographic zone determined by said locating unit.

In another feature of the invention, said receiver also includes means giving the user the choice of driving the switching unit, in particular when the geographic position determined by said locating unit corresponds to the boundaries of a relevant zone included in one or more relevant zones.

In another feature of the invention, said receiver is designed to receive—in addition to the description of the relevant zones and the addresses of said services—also additional information of data density and service quality. In this event said receiver includes means enabling the user to drive the switching unit with regard to a selection of data density and/or service quality so that said switching unit be able to switch said receiver sub-assembly to receive the service(s) linked to the relevant zone(s) of which the data density and/or the service quality shall correspond to said user's selection.

In another feature of the invention, the locating unit is fitted with an extrapolation function allowing knowing at any instant the vehicle position based on the previously stored coordinates.

The above features of the invention as well as further ones are elucidated in the following description of an illustrative embodiment of the invention and in relation to the attached drawings.

Figure 2:
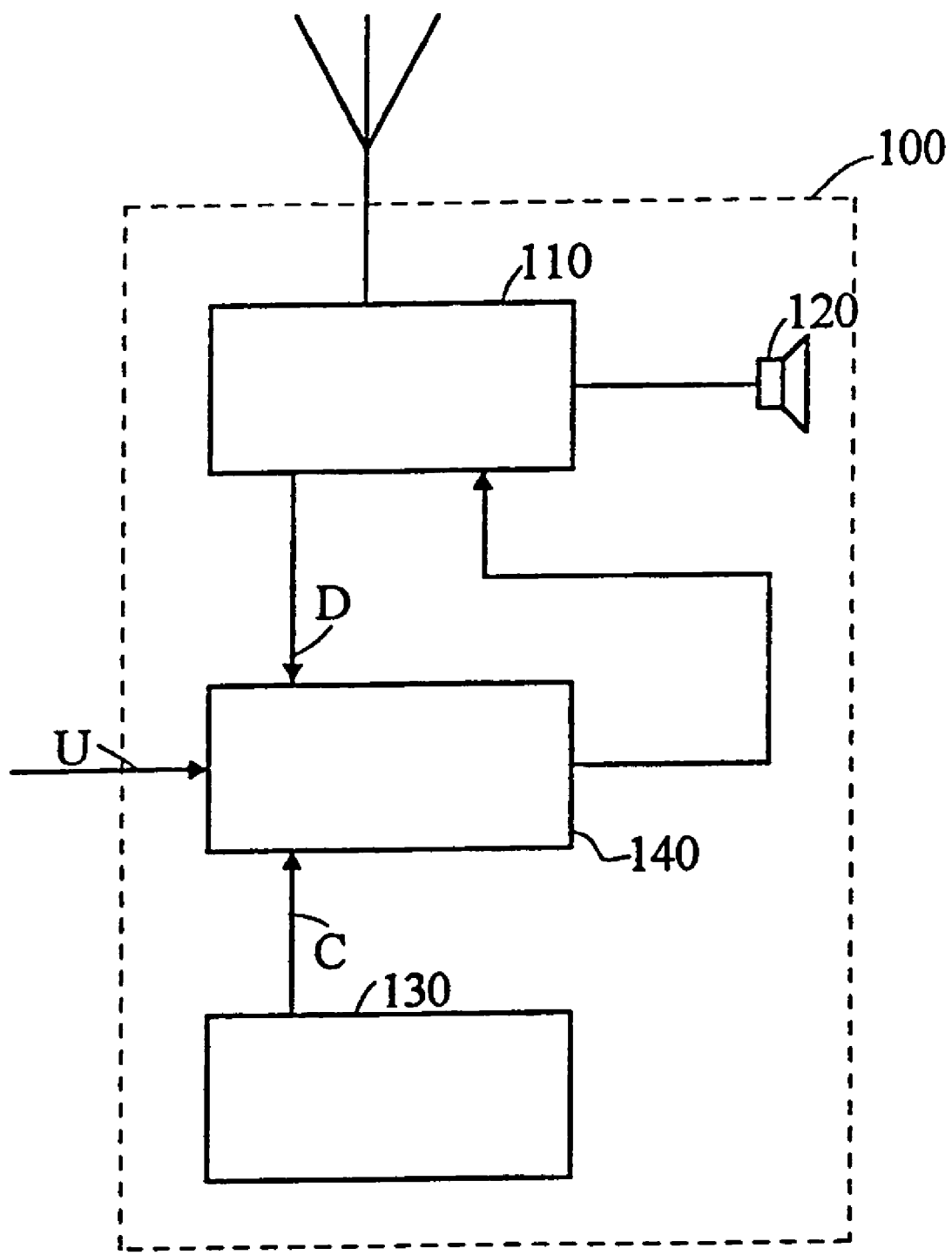

FIG. 1 is a schematic of a services broadcasting system of the present invention, and FIG. 2 is a summary schematic of a services broadcasting system receiver of the present invention.

The dotted lines in FIG. 1 represent the coverage zones 10, 20, 30 and 40 of resp. transmitters 1 through 4.

Transmitter 1 transmits one or several services of which the relevant geographic zone 11 is shown in FIG. 1. Be it borne in mind that several services may be transmitted to one relevant geographical zone. Transmitter 2 transmits services to its relevant zones 21, 22 and 23. Transmitter 3 transmits at least one service to a relevant zone 31. Transmitter 4 transmits services to relevant zones 41 and 42.

A relevant zone 32 is used for at least one service transmitted simultaneously by the transmitters 1, 2, 3 and 4.

In the description herein, the term "transmission" is taken broadly and includes broadcasting.

It is understood that, by being outside one of the given relevant zones, the services linked to said zone(s) are of no interest to the user. Illustratively this applies to road traffic services.

Be it noted that the relevant geographic zones of the services transmitted by a transmission system are not mandatorily within the coverage of said transmitters. This is the case in FIG. 1 (for instance the relevant geographic zone 31 is within the coverage 30 of the transmitter 3) except for the relevant zone 32.

Each relevant geographic zone is determined by one or a set of features defining a particular geometric shape. These may be features defining one or a set of circles, one or a set of ellipses, also a set of circles, lines, ellipses etc.

Advantageously at least one, or each relevant zone illustratively is defined by a closed set of lines defining in this manner one or more polygons.

In order to simplify defining the polygons by means of the coordinates generally used in broadcasting road traffic services, a polygon which defines a relevant geographic zone will be situated by at least one of its apices on road markers (mile signs, toll stations . . . ).

Also, to allow adequate service switching time, the zone topologies are such that two neighboring zones may overlap.

In the case of increasing-density services, the zones are defined so that some of them, for instance zone 23 in FIG. 1, shall be situated rigorously within other zones, in this case within zone 22.

In addition to transmitting services to the relevant zones it covers, each transmitter 1 through 4 transmits the descriptions of the relevant zones and of the addresses of said services and furthermore transmits the descriptions of the relevant zones and the service addresses of those zones which are neighboring to the coverage zones of the particular transmitter.

Such descriptions may be complemented by optional information relating to data density and service quality data.

FIG. 1 for instance transmitter 2 transmits the services for the relevant zones 21, 22 and 23 and 32, furthermore the definitions of said services, that is at least the description of said zones 21, 22 and 23 and 32 and the addresses of the corresponding services. However it also transmits the descriptions of the relevant zones 11, 31, 41 and 42 and the addresses of the corresponding services.

Illustratively a traffic information service relating to the Paris outer suburbs is available from a digital audio broadcast (DAB) system. This service is defined by a relevance zone subtended by the inside of a polygonal line linking the toll stops of main highways leaving Paris and by a service address (frequency band and service number).

Another traffic information service is linked to the A6 highway between the Fleury and Lyons tollbooths on a synchronous FM network. This service will integrate a description of the relevant zone being within a polygonal line along the contours of A6 between the two preceding points and a service address (for instance the FM and a service number).

Illustratively zone 32 is one of synchronized broadcasting, that is being of the same frequency along the itinerary, when changing transmitters but without switching the receiver.

Advantageously the neighboring relevant zones do overlap. For instance zone 22 overlaps zones 11 and 31 in FIG. 1.

FIG. 2 shows a receiver 100 to implement the method of the invention. Said receiver comprises a receiver sub-assembly 110 to receive the transmissions from the services transmitters and to reproduce them by a reproducing device 120, a locating unit 130 to feed the vehicle coordinates C to a switching unit 140. The receiver sub-assembly 110 also feeds the description D of the relevant zones to the switching unit 140. If the coordinates C from the locating unit 130 correspond to the boundaries of a given relevant zone defined in the signal D, said switching unit will switch the receiver sub-assembly 110 to receive the service linked to that relevant zone.

When the coordinates fed from the locating unit 130 correspond to the boundaries of a relevant zone which is within one or more other relevant zones, the user may drive the switching unit (signal U) to select either of said services.

In one embodiment variation and when the receiver sub-assembly 110 is designed to receive—in addition to the description of the relevant zones and the addresses of said services—optional information about data density and service quality, the user also may drive the switching unit to select the data density and/or the service quality in such a way that said switching unit be able to switch said receiver sub-assembly for the purpose of receiving the service(s) linked to the relevant zone(s) of which the data density and/or the service quality correspond to the selection of said user. It will be borne in mind that to the extent there is overlap of the present relevant zone and the new one, the time of switching may be delayed so as to be a less abrupt transition for the user.

Moreover, if the locating unit 130 provides the vehicle coordinates at substantially long time intervals, said unit may be fitted with an extrapolating function allowing ascertaining at any time the vehicle position based on the previously stored coordinates.

As regards FIG. 1, a user moving along the line xx' receives the information from the transmitter 1 and consequently will receive the service(s) of which zone 11 is the relevant zone. The receiver unit 110 receives not only the description of the zone 11 and of the corresponding service(s), but also the description of the zones 21, 22, 23 and 32 and of the corresponding services.

When entering the relevant zone 32, the receiver sub-assembly 110 may receive either the services linked to the zone 11 or those linked to the zone 32. The selection shall be made by the user, either directly or by specifying user-selected criteria in the manner described above.

Upon entry into the relevant zone 22, the switching unit 140 switches the receiver subs-assembly 110 on one hand toward the transmitter 2 and on the other hand toward the service(s) linked to the zone 22 or the zone 32. Delay in switching may take place.

Once within the coverage of zone 22 or zone 32, the receiver sub-assembly 110 receives the service corresponding to that zone, further the description of this relevant zone 22, also that of the zones 21 and 23, as a result of which, at entry into the zone 23, the switching unit 140 is able to switch the receiver sub-assembly toward the zone 23. However, said zone 23 being within the zone 22, the user may intervene to dictate his choice.

Illustratively the zone 22 may define "Brittany" whereas the zone 23 included in zone 22 will define a more specific, versatile and targeted service, namely (city of) "Rennes", (therein), such as travel time, parking lots etc.

Be it further borne in mind that when the zones 22 and 23 are covered, the receiver sub-assembly 110 also receives the definition of the zones 11, 21, 31 and 41 (and possibly zone 42).

The invention claimed is:

1. A transmission system for services linked to relevant geographic zones, said system comprising:
   at least one transmitter for transmitting said services into said relevant zones;
   a receiver comprising a receiver sub-assembly for receiving said services, a locating unit for determining the geographic position of said receiver; and
   a switching unit for switching said receiver sub-assembly for enabling said receiver sub-assembly to receive at least one service linked to at least one relevant zone corresponding to the geographic position ascertained by said locating unit wherein:
      while transmitting the services linked to overlapping relevant zones, said transmitter is arranged to transmit descriptions of the relevant zones, addresses of the services linked to the relevant zones, and descriptions and addresses of services of neighboring relevant zones.

2. Services transmission system as claimed in claim 1, wherein at least one relevant geographic zone among said zones overlaps at least one neighboring relevant zone.

3. Services transmission system as claimed in claim 1, wherein each relevant geographic zone is defined by a set of geometric features.

4. Services transmission system as claimed in claim 3, wherein at least one relevant geographic zone is determined by a closed set of geometric features defining one or more polygons defining at least one polygon.

5. Services transmission system as claimed in claim 4, wherein at least one apex of at least one of said one or more polygons is coincident with road markers.

6. Services transmission system as claimed in claim 1, wherein some of said relevant zones are included rigorously within others of said relevant zones.

7. Services transmission system as claimed in claim 1, wherein each transmitter is also arranged to transmit optional information about data density and service quality.

8. A receiver for receiving services linked to relevant geographic zones and transmitted by at least one transmitter, said receiver comprising:
   a locating unit for determining a geographic position of said receiver;
   a receiver sub-assembly which, simultaneously with said receiver, is arranged for receiving:
      (a) the services linked to the zones wherein said receiver is located,
      (b) descriptions of the relevant zones, addresses of the services linked to the relevant zones, and
      (c) descriptions and addresses of services of neighboring relevant zones; and
   a switching unit for receiving said descriptions and switching said receiver sub-assembly so that said receiver sub-assembly can receive at least one of the services linked to at least one of the relevant zones corresponding to the geographic position ascertained by said locating unit.

9. Receiver as claimed in claim 8, further including an actuator for enabling a user to activate the switching unit according to when the geographic position determined by said locating unit corresponds to boundaries of a relevant zone situated within one or more other relevant zones.

10. Receiver as claimed in claim 8, wherein said receiver sub-assembly is arranged for receiving information on density data and service quality, said receiver sub-assembly further including a user selector for enabling a user to select at least one of data density and service quality applied to the switching unit such that said switching unit is able to switch said receiver sub-assembly to receive the service(s) linked to the relevant zone(s) of which at least one of the data density and the service quality correspond to said user's selection.

11. Receiver as claimed in claim 8, wherein the locating unit is fitted with an extrapolation function for instantaneously determining vehicle position based on previously sorted coordinates.

12. A method of transmitting services linked to relevant geographic zones, said method comprising:
   transmitting said services into said relevant zones;
   receiving said services at a receiver in one of said zones;
   determining the geographic position of said receiver;
   receiving at the receiver site at least one service linked to at least one relevant zone corresponding to the determined geographic position;
   transmitting descriptions of the relevant zones, addresses of the services linked to the relevant zones, and descriptions and addresses of services of neighboring relevant zones while transmitting the services linked to a plurality of the relevant zones that overlap.

* * * * *